United States Patent [19]

Gerard et al.

[11] Patent Number: 5,705,033
[45] Date of Patent: Jan. 6, 1998

[54] PAPER/PAPER LAMINATE-OPACIFYING TIO₂ PARTICULATES

[75] Inventors: Bernard Gerard, Mulhouse; Remy Lorang, Cernay; Anny Mazzacavallo, Le Tilhot, all of France

[73] Assignee: Rhone-Poulenc Chimie, Courbevoie Cedex, France

[21] Appl. No.: 998,580

[22] Filed: Dec. 30, 1992

[30] Foreign Application Priority Data

Dec. 30, 1991 [FR] France .................... 91 16296

[51] Int. Cl.⁶ ...................... D21H 21/00; C09C 1/36
[52] U.S. Cl. ................ 162/168.3; 106/447; 106/448; 162/181.5; 162/183
[58] Field of Search .................... 106/447, 448; 162/181.5, 168.3, 183

[56] References Cited

U.S. PATENT DOCUMENTS

| | | | |
|---|---|---|---|
| 3,425,855 | 2/1969 | Barksdale et al. | 106/447 |
| 4,495,245 | 1/1985 | Zunker | 428/403 |
| 4,874,466 | 10/1989 | Savino | 162/164.3 |
| 5,169,441 | 12/1992 | Lauzon | 106/416 |

FOREIGN PATENT DOCUMENTS

| | | |
|---|---|---|
| 0045562 | 2/1982 | European Pat. Off. . |
| 0281134 | 9/1988 | European Pat. Off. . |
| 0491346 | 6/1992 | European Pat. Off. . |
| 114783 | 8/1982 | Japan . |

OTHER PUBLICATIONS

World Patents Index Latest Accession No. 81-14401D, Week 09, Derwent Publications Ltd., London, Great Britain. no date.

*Primary Examiner*—Mark L. Bell
*Assistant Examiner*—Scott L. Hertzog
*Attorney, Agent, or Firm*—Burns, Doane, Swecker & Mathis, L.L.P.

[57] ABSTRACT

Unique titanium dioxide (TiO₂) particulates have an especially high physicochemical affinity for cellulosic fibers and, thus, are well suited as opacifying pigments for paper and paper laminates, and include a zeta potential-adjusting amount of at least one cationic polymer, e.g., a polymer of a quaternary ammonium, sulfonium or phosphonium salt or a copolymer of acrylamide with a cationic comonomer, fixed to the face surfaces thereof.

13 Claims, No Drawings

PAPER/PAPER LAMINATE-OPACIFYING $TIO_2$ PARTICULATES

BACKGROUND OF THE INVENTION

1. Field of the Invention

The present invention relates to novel titanium dioxide particulates having a controlled surface charge and to the use of such particles as opacifying pigments for papers and for paper-based laminates.

This invention especially relates to novel titanium dioxide particulates, the face surfaces of which have been treated with at least one cationic polymer, and, notably, to such titanium dioxide particulates exhibiting a particularly high physicochemical retention on cellulosic fibers.

2. Description of the Prior Art

It is known to this art that titanium dioxide, especially in its rutile form, is particularly useful as an opacifying pigment in the manufacture of paper, especially paper destined for incorporation into laminated products. Indeed, titanium dioxide is a white pigment which has a high index of refraction; it is one of the compounds which, for an optimum particle size (in general ranging from 0.2 to 0.3 μm), best diffuses light.

It is also known to this art to manufacture laminated (or layered) articles based on a resin, especially a melamine or melamine/formaldehyde resin, and paper pigmented with titanium dioxide. Thus, for example, the pigmented paper is impregnated with a solution of the resin, after which several pigmented paper sheets impregnated with resin are layered thereon using hot pressing techniques. In known manner, in order that the layered pigmented paper products exhibit but slight color degradation after exposure to light, namely, more than satisfactory light-fastness, the titanium dioxide pigment, prior to its incorporation, is subjected to an inorganic surface treatment generally intended to impart a high photochemical stability thereto. Such inorganic surface treatment can be carried out, for example, using silica, alumina and/or zinc oxide, optionally in admixture with phosphates.

The incorporation of titanium dioxide in paper typically entails fixing titanium dioxide onto cellulose fibers predispersed in water, such "fixing" being attained essentially by electrostatic attraction between the cellulosic fiber and the titanium dioxide particle. The cellulosic fiber is inherently negatively charged.

Moreover, during the preparation of paper, it is known to employ an agent for improving resistance in the damp state (or agent for hardening in the damp state), especially a quaternary ammonium salt of an epichlorohydrin-based polymer (for example, of epichlorohydrin/dimethylamine), which serves as a "bridge" between the cellulosic fibers (electronegatively charged). This agent will ensure that the paper remains intact, especially during its impregnation with the resin solution during the preparation of laminated articles. However, this agent can promote disastrous consequences for the titanium dioxide pigment, i.e., it can effect its flocculation and, above all, reduce its physicochemical retention, especially in the event that the amount of agent employed is increased—the titanium dioxide pigment can then partially be removed or dissociated from the cellulosic fibers.

Finally, the opacity of paper pigmented with titanium dioxide, or of the laminated product based on said paper, is especially dependent on the titanium dioxide content of the paper; it is thus a function of the degree of fixing onto the cellulosic fibers and of the physiochemical retention of the titanium dioxide.

Although there exist titanium dioxides which can be used for this application in paper manufacture, these nevertheless still present certain significant disadvantages.

Thus, for example, titanium dioxides currently used as opacifying pigments have a physicochemical retention which can be inadequate. The physicochemical retention quantifies the ability of titanium dioxide to be retained on the cellulosic fibers of the paper. By "degree of retention" is intended the ratio of the amount of titanium dioxide effectively fixed on the cellulosic fibers to the total amount of titanium dioxide used during the incorporation operation. This inadequacy in the physicochemical retention adversely affects the economics of the process, presents problems of pollution and effluent recycling, and reduces the final opacity properties of the paper or the paper laminate.

Too, the titanium dioxides currently used as opacifying pigments are fairly sensitive to agents for enhancing resistance in the damp state, in the sense that their physicochemical retention and, consequently, the opacity of the pigment paper or of the layered product based on the pigmented paper is very substantially reduced when the amount of such agent in increased.

It is also known that titanium dioxide has a tendency to undergo autoflocculation, namely, to agglomerate if the concentration of ions contained in the water used during the preparation of the paper is high (hard water).

SUMMARY OF THE INVENTION

Accordingly, a major object of the present invention is the provision of improved titanium dioxide particulates, especially in the rutile or anatase forms thereof, having improved physiochemical retention to cellulosic fibers and which are thus completely suitable for use as opacifying pigments in papermaking formulations, and which otherwise avoid or conspicuously ameliorate the above disadvantages and drawbacks to date characterizing the state of the art.

Another object of the present invention is the provision of improved titanium dioxide particulates having characteristics that advantageously influence properties such as physicochemical retention on cellulosic fibers, and thus the opacity of paper pigmented with such titanium dioxide particles or of laminated (or layered) articles based on this pigmented paper, while retaining a good light-fastness in the latter.

Briefly, the present invention features titanium dioxide particulates that are especially well suited as opacifying pigments for paper, notably postforming paper and paper for laminated articles, which are widely employed in the furniture industry, such $TiO_2$ particles having at least one cationic polymer adsorbed onto the surface area thereof.

DETAILED DESCRIPTION OF PREFERRED EMBODIMENTS OF THE INVENTION

More particularly according to the present invention, the subject titanium dioxide is, preferably, in the rutile form, but it can also be in the anatase form.

The content of cationic polymer of a particle according to the invention advantageously ranges from 0.05% to 10% by weight, preferably from 0.1% to 1.5% by weight and, still more preferably, from 0.1% to 1.1% by weight.

For use in paper for laminated or layered products, the cationic polymer used is preferably stable to light and temperature.

The cationic polymer can be fixed to the surface of the titanium dioxide particulates via any suitable deposition technique known to this art.

One particularly simple technique entails spraying, for example using a sprayer, under compressed air, an aqueous solution of the cationic polymer onto the titanium dioxide particles; the latter, once treated, are then typically dried, for example at a temperature of from 110° to 200° C., and then micronized under air or steam pressure. It will of course be appreciated that the present invention is not limited to this particular technique of incorporation.

The titanium dioxide particulates according to the invention can be subjected to an inorganic surface treatment prior to deposition of the cationic polymer thereon, this treatment generally being intended to confer a high photochemical stability to the particles. This type of inorganic treatment, carried out for the abovementioned purpose, is well known to this art. It especially entails depositing an inorganic layer on the surface area of the titanium dioxide particles, preferably in rutile state. Such inorganic layer is generally constituted of one or more oxides or oxyhydroxides; it is formed, for example, from at least one compound selected from among the oxides and oxyhydroxides, preferably oxyhydroxides, of silicon, aluminum, titanium, zinc, zirconium, cerium and antimony. These oxides and oxyhydroxides can optionally be used in a mixture with phosphates. Their deposition onto the surface of the titanium dioxide particles is generally attained by hydrolysis or neutralization of the corresponding water soluble salts. This deposition, is, as the case may be, optionally accompanied by a calcination at a temperature generally greater than 400° or 600° C.

The cationic polymer employed in the present invention generally has a mean molecular weight ranging from 10,000 to 3,000,000, for example from 20,000 to 1,000,000.

In a preferred embodiment of the invention, this cationic polymer is a polymer of a quaternary ammonium, sulfonium or phosphonium salt, preferably of a quaternary ammonium salt.

Preferably, said polymer is a copolymer of acrylamide with a cationic monomer.

This cationic monomer is especially selected from among the diallyldialkylammonium salts, salts of trialkylammonioalkyl acrylate and methacrylate, salts of trialkylammoniohydroxyalkyl acrylate and methacrylate, salts of dialkylsulfonioalkyl acrylate and methacrylate, and quaternary ammonium salts of aminoalkyl acrylates and methacrylates.

More particularly, such monomer is selected from among diallyldimethylammonium chloride (($CH_3$)$_2$(CH$_2$CH=CH$_2$)$_2$N$^+$Cl$^-$), diallyldiethylammonium chloride (($C_2H_5$)$_2$(CH$_2$CH=CH$_2$)$_2$N$^+$Cl$^-$), the chloride of trimethylammonioethyl methacrylate ($CH_2$=C($CH_3$)—COOCH$_2$CH$_2$N$^+$($CH_3$)$_3$Cl$^-$, the methylsulfate of trimethylammonioethyl methacrylate ($CH_2$=C($CH_3$)—COOCH$_2$CH$_2$N$^+$($CH_3$)$_3$ $CH_3OSO_3^-$), the chloride of trimethylammoniohydroxypropyl methacrylate ($CH_2$=C($CH_3$)—COOCH$_2$CH(OH)CH$_2$N$^+$($CH_3$)$_3$Cl$^-$), the methylsulfate of dimethylsulfonioethyl acrylate ($CH_2$=CH—COOC$_2$H$_4$S($CH_3$)$_2$CH$_3$OSO$_3^-$, and the quaternary ammonium salts of aminoethyl methacrylate ($CH_2$=C($CH_3$)—COOCH$_2$CH$_2$NH$_2$).

The cationic polymer according to the invention is preferably a copolymer of diallyldimethylammonium chloride and of acrylamide.

Such cationic polymer can also be a homopolymer of a diallyldialkylammonium (for example diallyldimethylammonium) chloride.

Finally, this cationic polymer can optionally be selected from among the condensation polyamines and polyimines (such as a polyethyleneimine) after quaternization.

The nature and the amount of the cationic polymer(s) fixed to the surface of the titanium dioxide particles makes it possible to adjust the zeta potential (and thus the charge) thereof, as desired.

This is advantageous in the field of paper manufacturing. Indeed, this enables the paper manufacturer to have available an entire range of titanium dioxide particles whose zeta potential will range from negative to highly positive (and thus whose surface charge will range from anionic to highly cationic (electropositive)). Thus, especially depending on the hardness of the water used during the preparation of the paper, the paper manufacturer will be able to select an opacifying pigment whose zeta potential ranges from negative to highly positive.

Advantageously, the titanium dioxide particles according to the invention have a zeta potential suited to the liquid medium into which they are introduced (for example, the medium for the preparation of paper, which additionally contains water and cellulosic fibers). In particular, the zeta potential of said particles contained in the liquid medium can be positive up to a pH of at least 5.5, preferably of at least 7 and, still more preferably, of at least 8.5. According to this preferred embodiment of the invention, the particles are thus characterized in that they have an isoelectric point (IEP) of at least 5.5, preferably of at least 7 and, still more preferably, of at least 8.5.

It will be appreciated that when a particle in suspension moves in a liquid (under the influence of thermal agitation or of a gravity field, for example), it is surrounded by a boundary layer where the velocity of the fluid passes continuously from V, velocity of the particle, to 0 on moving away from the surface. The decrease in the velocity ceases sufficiently distinctly that it is possible to define an external surface of the particle, separating molecules which are borne by the external surface from those which are not. Such surface is designated the "shearing" surface.

In practice, this surface is situated on the Stern layer or slightly outside the latter. The mean electrostatic potential on this surface is the zeta potential. Among all the values of the potential between the surface and infinity, this is the only one which can be measured.

The principle of measurement of the zeta potential includes, especially, measuring the velocity of the particle in suspension while moving in an electrostatic field E. When V is this velocity, the ratio V/E=U (in m$^2$/Volt.s) represents the electrophoretic mobility of the particle. This situation is represented by the equation:

$$\text{Zeta potential} = \frac{3}{2} \cdot \frac{\eta U}{\epsilon}$$

wherein:

η: viscosity of the liquid (in pascal.s),

ε: dielectric constant of the liquid (in S.I. units), f(Ka): factor varying from ⅔ to 1 according to the radius of the particle (a) with respect to the thickness of the double layer (1/K).

The isoelectric point (IEP) corresponds to the event that the system under consideration has a mean zeta potential of zero. Experimentally, this is translated into a zero displacement velocity in a non-zero electrostatic field. The isoelectric point is then defined by the pH of a suspension of titanium dioxide according to the invention (in the liquid) for which the electrophoretic mobility of a particle of this titanium dioxide in the liquid is zero (*Zero Potential in Colloid Science*, Robert J. Hunter, Academic Press, 1981).

The zeta potential can be measured (as in the examples below) using an apparatus marketed under the trademark Lazer Zée Meter (Model 501-Pen Kem).

The titanium dioxide particles having a positive zeta potential at a pH of at least 5.5, preferably of at least 7 and, still more preferably, of at least 8.5, are particularly advantageous for the preparation of paper, especially of paper for laminated products, more particularly of laminated paper for postforming (which is a paper which can be shaped into rounded forms without breaking). Indeed, the medium for preparation of paper, especially paper for laminated products, generally has a pH on the order of 5.5 to 7 and that of laminated paper for postforming a pH on the order of 8 to 8.5, and thus pHs at which the charge of the titanium dioxide particles according to the invention is still preferably cationic. The fixing of titanium dioxide particles onto cellulosic fibers is greatly favorably assisted by the electrostatic attraction between the anionic charge of the cellulosic fibers and the cationic charge of said particles. The physicochemical retention of said particles and thus the opacity of the pigmented paper and of a laminated product based on said pigmented paper impregnated with a resin are very substantially improved, especially when the waters employed during the manufacture of the paper have a high concentration of ions. Moreover, the autoflocculation phenomenon of said particles in the presence of the same water is very substantially reduced, even inhibited.

Likewise, the opacifying pigment constituted by the titanium dioxide particles is then not very sensitive to the action of an agent for improving the resistance in the damp state which is traditionally used, in an amount of 1% to 5% by weight, preferably from 3% to 5% by weight with respect to the combined weight of opacifying pigment+cellulosic fibers, during the manufacture of the paper. This is contrary to the case, especially, where the cationic polymer would be added subsequently, in the medium for the preparation of paper and no longer fixed beforehand to the titanium dioxide particles (such agent is employed to ensure that the paper remains intact, especially during its impregnation by a solution of a resin, to prepare a laminated article based on said paper).

The present invention thus features the use of at least one of the titanium dioxide particles according to the invention as an opacifying pigment for paper, and for paper-based laminated (or layered) products, especially for paper-based laminated products for postforming.

This invention also features paper (or a paper formulation) containing at least one opacifying pigment, such pigment comprising at least one of the titanium dioxide particles described above.

Any process for the preparation of paper (or paper formulation) known to this art can be employed (using the specific opacifying pigment) to produce paper according to the invention. The invention, however, is not limited to any specific preparative technique. The paper according to the invention is typically prepared from a mixture of water, cellulosic fibers and the specific opacifying pigment, optionally in the presence of an agent for improving the resistance in the damp state (wet strength). Exemplary such agents include the quaternary ammonium salts of epichlorohydrin-based polymers (for example, of epichlorohydrin/ dimethylamine polymers).

The present invention also features paper-based laminated (or layered) products, especially for postforming, additionally containing at least one resin (especially a melamine or melamine/formaldehyde resin) and at least one opacifying pigment, said pigment comprising at least one of the titanium dioxide particulates described above.

Any process for the preparation of paper laminated products known to this art can be employed (using a paper pigmented with the specific opacifying pigment) to produce the laminated products according to the invention. The invention, however, is not limited to any specific preparative technique. Thus, for example, the pigmented paper can be impregnated with a water/alcohol solution of resin, after which a number of pigmented paper sheets impregnated with resin are layered thereon using hot pressing techniques. The pigmented paper can contain an agent for improving resistance in the damp state.

Methods for the preparation of the paper-based laminated products are described in FR-1,473,692, FR-1,504,211 and FR-1,537,805 (which also describe inorganic surface treatments of titanium dioxide particles).

In order to further illustrate the present invention and the advantages thereof, the following specific examples are given, it being understood that same are intended only as illustrative and in nowise limitative.

EXAMPLE 1

500 grams of titanium dioxide (marketed by Thann and Mulhouse under the trademark RL 18) were introduced into a 5-liter glass beaker maintained under stirring at 25 revolutions/minute. This titanium dioxide was a rutile titanium dioxide pigment which had been subjected to an inorganic surface treatment conferring a negative zeta potential thereon at a pH of 5.5. 100 ml of aqueous cationic polymer solution were sprayed onto the titanium dioxide using a sprayer under compressed air. The titanium dioxide thus treated was then dried at 160° C. under a heating resistor. During the entirety of the treatment operation, the beaker was maintained under stirring.

The zeta potential values, at a pH of 7 and at a pH of 8.5, of titanium dioxide treated with different cationic polymers and of untreated titanium dioxide ("RL 18") are reported in Table 1 below. These values were measured using a Lazer Mee Meter (Model 501-Pen Kem) zetametric apparatus.

TABLE 1

|  | Polymer quantity | Zeta potential (in millivolt) | |
|---|---|---|---|
|  | (weight %) | pH = 7 | pH = 8.5 |
| TiO$_2$ ("RL 18") | 0 | −35 | −40 |
| TiO$_2$ + polyethyleneimine | 1 | +48 | +42 |
| TiO$_2$ + "Polybrene" | 1 | +50 | +47 |
| TiO$_2$ + "Acurac 181" | 0.1 | +33 | +25 |
| TiO$_2$ + "Nalco 8105" | 0.1 | −19 | −30 |
|  | 0.5 | +40 | +27 |
|  | 1 | +53 | +47 |

In Table 1, the polymer quantity is the percentage by weight of polymer of the treated titanium dioxide.

"Polybrene" is a 1,5-dimethyl-1,5-diazaundecamethylene polymethobromide marketed by Aldrich.

"Nalco 8105" is a copolymer of acrylamide and diallyldimethylammonium chloride and is marketed by Nalco.

"Acurac 181" is a copolymer of acrylamide and a cationic monomer and is marketed by Cyanamid.

EXAMPLE 2

The degree of titanium dioxide obtained (TiO$_2$ retention degree) in a paper sheet (or test sheet) of 80 g/m$^2$, prepared, without addition of an agent for improving resistance in the damp state, at a pH of 6.5 to 8.5, was measured in this Example for various titanium dioxides.

(1) 100 parts of cellulosic fibers, predispersed at 40 g/l in water, and 70 parts of titanium dioxide particles, predispersed at 40% by weight in water (the volume of cellulosic fibers+titanium dioxide was determined such as to provide a test sheet of 80 g/m$^2$), were mixed in a beaker with stirring.

The pH was then adjusted to the value of 6.5 by addition of hydrochloric acid.

Dilution was then carried out with 3 liters of water; 500 cm$^3$ of the suspension obtained were withdrawn and were used to manufacture a test sheet on the Haag apparatus (laboratory test sheet drawer).

The 80 g/m$^2$ test sheet obtained was dried.

(2) The procedure of Example (1) was repeated, except that the pH was adjusted to the value of 8.5 by addition of sodium carbonate.

The 80 g/m$^2$ test sheets obtained in (1) and (2) were then calcined at 800° C.; the ash obtained was then measured: from the preparation, this ash corresponded to the mass of titanium dioxide contained in the test sheet.

The TiO$_2$ retention degree then corresponded to the Ash mass/Titanium dioxide mass used in the preparation ratio.

This retention degree was measured for three different graded titanium dioxides A, B and C (the results are reported in Table 2):

(i) Titanium dioxide A corresponded to the electronegative starting titanium dioxide used in Example 1 (marketed by Thann and Mulhouse under trademark RL 18), namely, a rutile titanium dioxide pigment which had been subjected to an inorganic surface treatment conferring a negative zeta potential thereon at a pH of 5.5.

(ii) Titanium dioxide B (marketed by Thann and Mulhouse under trademark RL 62) was a rutile titanium dioxide pigment which had been subjected to an inorganic surface treatment conferring a positive zeta potential at a pH of 5.5

(iii) Titanium dioxide C was in accordance with the invention: it was obtained by fixing a copolymer of acrylamide and of diallyldimethylammonium chloride ("Nalco 8105") onto the surface of titanium dioxide A; titanium dioxide C contained 1% by weight of said cationic copolymer.

TABLE 2

| Degree of Retention of TiO$_2$: | | | |
|---|---|---|---|
| | A | B | C |
| pH = 6.5 | 5% | 53% | 61% |
| pH = 8.5 | 3% | 22% | 53% |

EXAMPLE 3

The opacity was determined of test sheet layered products containing 80 g/m$^2$, prepared in the presence of an agent for improving resistance in the damp state, based on epichlorohydrin/dimethylamine polymer marketed by Bayer under the trademark Nadavin LT.

Test sheets containing 80 g/m$^3$ were thus prepared as in Example 2 by using, on the one hand, titanium dioxide A ("RL 18") and, on the other, titanium dioxide C, adjusting the pH to a value of 8.5 and adding (during the pH adjustment) various amounts of Nadavin LT.

In the event that titanium dioxide A was employed, the cationic copolymer ("Nalco 8105") was added to the medium for the preparation of the test sheet during the pH adjustment.

The dried test sheet was then impregnated by capillary action with a 45% by weight aqueous solution of melamine/formaldehyde resin for 1 minute. The resin surplus was removed by passing the impregnated test sheet between two glass rods and then drying it at 120° C. for 2 minutes. This test sheet was then immersed again in a bath of melamine/formaldehyde resin for 1 minute, the impregnated test sheet was then strained between two steel rods and, finally, the test sheet was dried at 120° C. for 3 minutes.

The test sheet treated in this manner was placed on a stack composed, upwardly from the bottom, of melamined brown wrapping paper, and of a half layer of the same brown wrapping paper and half of white barrier paper (the brown wrapping paper and the barrier paper are commercially available).

The array or assembly thus formed was placed between two stainless steel plates and pressed at 150° C. at 100 bars of pressure for 8 minutes; it was then cooled in the press and removed from the mold.

The values of the reflectance on the brown wrapping paper face and on the white barrier face were then measured using a colorimeter (Y filter).

The opacity then corresponded to the reflectance of the brown wrapping paper face/reflectance on the white barrier face ratio.

The opacity values of test sheet layered products prepared using titanium dioxide A (+ addition of the cationic polymer during the pH adjustment) and using titanium dioxide C, in the presence of various amounts of Nadavin LT (the Nadavin LT levels reported in Table 3 corresponding to the weight of Nadavin LT employed with respect to the total "cellulosic fibers+titanium dioxide" weight) are reported in Table 3 below. Table 3 also reports the content (in g/m$^3$) of titanium dioxide in each test sheet.

TABLE 3

| | Level of "Nadavin LT" | | | | | |
|---|---|---|---|---|---|---|
| | 1% | | 3% | | 5% | |
| TiO$_2$ employed | TiO$_2$ (g/m$^2$) | Opacity | TiO$_2$ (g/m$^2$) | Opacity | TiO$_2$ (g/m$^2$) | Opacity |
| A | 26.5 | 89.8 | 24.0 | 89.4 | 11.25 | 79.7 |
| C | 24.2 | 89.8 | 28.2 | 90.1 | 23.2 | 88.4 |

The product according to the invention was less sensitive to the action of the agent for improving resistance in the damp state than the titanium dioxide of the prior art used with addition of the cationic polymer during the preparation of the test sheet.

EXAMPLE 4

The opacity of test sheet layered products containing equal weights of titanium dioxide per square meter was determined, the titanium dioxide employed being selected from among the titanium dioxides A, B and C described above.

The method of preparation corresponded to that of Example 3 (but without addition of cationic polymer during the pH adjustment in cases A and B), the degree of agent for improving resistance in the damp state varying according to the titanium dioxides such as to provide a titanium dioxide content in the test sheet of 24.5 g/m².

The results are reported in Table 4.

TABLE 4

| TiO₂ | Opacity |
|---|---|
| A | 88.7 |
| B | 88.9 |
| C | 89.6 |

The improvement in the opacity in the case where titanium dioxide C according to the invention was employed is translated, for a desired opacity of 88.9 for example, into a substantial savings in titanium dioxide of approximately 15% by weight.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A method for making a paper substrate comprising preparing an opacifying agent by fixing at least one cationic polymer to the surface of titanium dioxide particulates, drying said particulates after depositing said at least one cationic polymer on the surface of the particulates, then forming a suspension of said opacifying agent and cellulosic fibers, and converting said suspension into a substrate, wherein said cationic polymer deposited on the surface of the particulates is a copolymer of an acrylamide and a cationic monomer or a homopolymer of diallyldialkylammonium chloride.

2. The method as defined by claim 1, said TiO₂ being in the rutile or anatase state.

3. The method as defined by claim 2, said TiO₂ being in the rutile state.

4. The method as defined by claim 1, comprising from 0.05% to 10% by weight of said at least one cationic polymer.

5. The method as defined by claim 1, comprising from 0.1% to 1.5% by weight of said at least one cationic polymer.

6. The method as defined by claim 1, having an isoelectric point of at least 5.5.

7. The method as defined by claim 6, having an isoelectric point of at least 7.

8. The method as defined by claim 7, having an isoelectric point of at least 8.5.

9. The method as defined by claim 1, comprising a photochemical-stabilizing amount of an inorganic interlayer deposited between the TiO₂ particles and said at least one cationic polymer affixed thereto.

10. The method as defined by claim 9, said inorganic interlayer comprising an oxide or oxyhydroxide of silicon, aluminum, titanium, zinc, zirconium, cerium or antimony, or admixture thereof with a phosphate.

11. The method as defined by claim 1, said at least one cationic polymer having a mean molecular weight ranging from 10,000 to 3,000,000.

12. The method as defined by claim 11, said particles having a particle size ranging from about 0.2 to 0.3 µm.

13. The method for making a paper substrate according to claim 1, wherein said particulates have been micronized.

* * * * *